United States Patent [19]

Klarstrom

[11] Patent Number: 4,762,682

[45] Date of Patent: Aug. 9, 1988

[54] NICKEL-BASE SUPER ALLOY

[75] Inventor: Dwaine L. Klarstrom, Kokomo, Ind.

[73] Assignee: Haynes International, Inc., Kokomo, Ind.

[21] Appl. No.: 898,568

[22] Filed: Aug. 21, 1986

[51] Int. Cl.$^4$ .................... C22C 19/05; C22C 30/00
[52] U.S. Cl. ................................... 420/454; 420/588
[58] Field of Search .............. 420/454, 443, 445, 588

[56] References Cited

U.S. PATENT DOCUMENTS 4,476,091  10/1984  Klarstrom ......................... 420/443

Primary Examiner—Melvyn J. Andrews
Attorney, Agent, or Firm—Joseph J. Phillips

[57] ABSTRACT

Disclosed herein is an improved chemical reactor apparatus of the type suitable for supporting a catalyst during the high temperature oxidation of ammonia to form nitric acid which is fabricated from a superior nickel base superalloy containing about: 20 to 24% chromium, 10 to 20% tungsten, 1.0 to 3.5% molybdenum, 0.3 to 1% manganese, 0.2 to 0.75% silicon, and up to 20% cobalt and in which certain relationships among these alloying elements provide a structure which has very high creep strength and resistance to the corrosive environment.

1 Claim, No Drawings

NICKEL-BASE SUPER ALLOY

CROSS REFERENCE TO RELATED APPLICATIONS

This invention is an improvement related to my earlier inventions disclosed in U.S. application Ser. No. 353,459, filed on Mar. 1, 1982 and now U.S. Pat. No. 4,476,091.

BACKGROUND OF THE INVENTION

This invention relates generally to chemical reactor apparatus and more specifically to the manufacture of metallic grids used to support a catalyst during production of nitric acid in high temperature reactor vessels.

In the manufacture of nitric acid by the oxidation of ammonia, high velocity gas containing about 10% by volume ammonia is passed through a platinum catalyst bed and reacted at high temperatures near 1700° F. to form acid.

The catalyst bed is typically formed by several layers of platinum wire gauze (e.g. 20 layers of No. 8 mesh screen) supported by a grid of larger bars or plates. The grid must support the weight of the catalyst (about 100 ounces per square foot) and resist the high aerodynamic drag during several months of continuous operation at high temperatures. Further, the grid material must resist oxidation, carburization, and nitriding by the hot flue gas while remaining straight and flat so as to prevent unoxidized ammonia from by-passing the catalyst.

There is a large demand for chemical reactor apparatus of this type since over 8,000 tons of nitric acid were produced by this method in the United States during 1985 and the use is increasing each year.

Typically, these support grids have been made from nickel-base superalloys which last about three years before replacement. Each grid uses about 3000 pounds of the expensive superalloy material and over 100 units are replaced each year on the average.

Thus, it should be apparent that an improved, longer lasting support grid is needed by the industry.

In addition to the aforementioned required corrosion resistance, it would be desirable for the support grids to be easily weldable and formable both during initial fabrication and later, after use, so that repairs may be made as necessary. Thus, thermal stability is an important property for the grid material. Many nickel-base superalloys do not have good thermal stability and become brittle when exposed to high temperatures for long periods of time.

Another property very desirable in these support grids is high creep strength so that the structures do not distort, or at least distortion is held to a minimum during their long exposure to high temperature stress.

Some of the problems and complexities involved and additional background information related to the general field of this invention may be found in U.S. Pat. No. 4,438,084 and the art cited therein.

SUMMARY OF THE INVENTION

A principal object of the present invention is to provide an improved, longer lasting, support grid for use during the high temperature catalitic oxidation of ammonia to form nitric acid.

Another object of the present invention is to provide a more efficient process for making nitric acid by increasing the structural stability of the catalyst support grid during long time use at high temperatures.

I have found that these and still further objects and advantages can be obtained by manufacturing these catalyst support grids from a particular nickel base superalloy. The alloy is a variation of my prior invention disclosed and claimed in U.S. Pat. No. 4,476,091 which is specifically incorporated herein by reference. That patent, and the art cited therein, disclose nickel base alloys containing chromium, tungsten and molybdenum in a critical relationship so as to provide a high degree of oxidation resistance and strength in prolonged elevated temperature environments such as gas turbine engines. I have found that this alloy, or a modification thereof, is unusually well suited for use as a catalyst support grid.

I prefer to make the support grid from a nickel base superalloy which contains about 20 to 24% chromium for oxidation resistance, 10 to 20% tungsten to decrease thermal expansion, 1.0 to 3.5% molybdenum for high temperature strength, 0.3 to 1.0% manganese also for oxidation resistance, 0.2 to 0.75% silicon also for oxidation resistance, optionally lanthanum up to about 0.005%, and/or cobalt up to a maximum of about 20%, provided, however, that the overall composition is adjusted within the foregoing ranges so that the electron vacancy number ($N_v$) is no more than about 2.5. (The method of determining the $N_v$ value is discussed in *The Journal of Metals*, October 1966 by C. T. Sims and in U.S. Pat. No. 4,118,223.)

I have found that lanthanum and cobalt are not absolutely necessary in the improved support grid of the present invention but when they are added, there is an unexpected increase in the grain size of the grid material which will provide a corresponding increase in creep strength.

However, to keep the $N_v$ value low when large amounts of cobalt are added, the amount of tungsten, molybdenum, and chromium must be reduced to the lower portion of the foregoing ranges.

Because of the grid's greater creep strength, better thermal stability and superior resistance to both oxidation and nitriding, they can provide as much as five times longer service intervals between straightening operations. Further, when straightening does become necessary, the grid's low loss in ductility after even longtime exposure to high service temperature makes repair very practical

DESCRIPTION OF THE PREFERRED EMBODIMENT

To demonstrate this invention, several samples were made and analyzed as listed below.

EXAMPLES

| %  | 1a    | 1b    | 2a    | 2b    | 3a    | 3b    |
|----|-------|-------|-------|-------|-------|-------|
| Co | 9.64  | 9.81  | 14.18 | 14.77 | 19.53 | 19.45 |
| Cr | 22.05 | 20.61 | 22.12 | 20.69 | 22.54 | 20.49 |
| W  | 11.85 | 11.81 | 11.62 | 11.95 | 11.97 | 11.70 |
| Mo | 2.29  | 2.08  | 2.24  | 2.11  | 2.09  | 2.05  |
| Mn | 0.55  | 0.57  | 0.51  | 0.56  | 0.24  | 0.54  |
| Si | 0.44  | 0.43  | 0.40  | 0.43  | 0.38  | 0.42  |
| Fe | 2.07  | 2.08  | 2.14  | 2.11  | 2.00  | 1.95  |
| Al | 0.37  | 0.41  | 0.34  | 0.43  | 0.40  | 0.40  |
| C  | 0.10  | 0.09  | 0.10  | 0.09  | .087  | 0.10  |
| La | .020  | .012  | .005  | .006  | .007  | .006  |
| B  | .007  | .007  | .011  | .007  | .007  | .007  |

-continued

| % | EXAMPLES | | | | | |
|---|---|---|---|---|---|---|
|   | 1a | 1b | 2a | 2b | 3a | 3b |
| Ni | 50.70 | 51.94 | 47.65 | 46.70 | 40.77 | 41.87 |
| Nv | 2.47 | 2.35 | 2.50 | 2.46 | 2.58 | 2.48 |
| grain size | ½ to 3½ | 1 to 4 | 1 to 2½ | 3 to 3½ | 1 to 6½ | 1 to 3½ |

Samples were rolled to 0.050" thick sheets, annealed at 2250° F. for 10 minutes then air cooled. Grain size was determined according to ASTM E112.

Because these samples were easily prepared, it is expected that this invention may be produced by most well known conventional techniques used to manufacture superalloys such as arc or induction melting in air or vacuum, consumable electrode melting, electroslag remelting and vacuum arc remelting. Furthermore, because the casting and working characteristics of the material are relatively trouble-free, the invention may be shaped by casting, forging, machining or powder metallurgy techniques.

Note that example 3a is outside the scope of the present invention because its $N_v$ number is greater than 2.5. In order to reduce the $N_v$ number at this level of cobalt (about 20%), the chromium level should be reduced as in example 3b.

As can be seen from the grain size measurements, there is a pronounced trend to increased grain size (smaller numbers) due to increases in cobalt content. This was very surprising since similar material without cobalt had a very fine grain size of 5 to 6. It is well known that creep-rupture strength at elevated temperatures is strongly dependent on grain size.

Therefore this material, especially that containing 10 to 15% cobalt, would provide a much improved, longer lasting catalyst support grid for use during the high temperature catalitic oxidation of ammonia to form nitric acid or other similar uses.

The table of examples shows that cobalt contents of about 10% to 20% are effective in providing a valuable combination of properties as may be required in a variety of commercial uses.

As will be apparent to those skilled in the art, the invention may be embodied in other forms or carried out in other ways without departing from the spirit or essential characteristics thereof. The present embodiment is, therefore, to be considered in all respects as illustrative and not restructive. The scope of the being indicated by the appended claims and all modifications or changes which come within the range of equivalency are intended to be included.

What is claimed is:

1. A nickel-base superalloy consisting essentially of, in weight percent, 20 to 24% chromium, 10 to 20% tungsten, 1.0 to 3.5% molybdenum, 0.1 to 1% manganese, 0.2 to 0.75% silicon, about 10% to 20% cobalt and the balance nickel plus normal inpurities and having an $N_v$ value of no more than about 2.5.

* * * * *